United States Patent

Wang et al.

[11] Patent Number: 5,907,423
[45] Date of Patent: May 25, 1999

[54] SCANNING OPTICAL DELAY DEVICE HAVING A HELICOID REFLECTING MIRROR

[75] Inventors: Chi-Luen Wang; Ci-Ling Pan, both of Hsinchu, Taiwan

[73] Assignee: National Science Council, Taipei, Taiwan

[21] Appl. No.: 09/098,288

[22] Filed: Jun. 16, 1998

Related U.S. Application Data

[62] Division of application No. 08/760,036, Dec. 4, 1996, Pat. No. 5,784,186.

[51] Int. Cl.$^6$ .................................................. G02B 26/08
[52] U.S. Cl. .................... 359/203; 359/201; 359/198; 359/200; 359/216; 359/869; 359/868
[58] Field of Search ..................................... 359/196–226, 359/850, 855, 858, 859, 868, 869; 358/489–491

[56] References Cited

U.S. PATENT DOCUMENTS

| | | | |
|---|---|---|---|
| 3,729,248 | 4/1973 | Beduchaud | 359/204 |
| 4,494,821 | 1/1985 | Lewis et al. | 359/212 |
| 5,153,769 | 10/1992 | Rubinstein et al. | 359/226 |

OTHER PUBLICATIONS

R.F. Fork and F.A. Beissoer, "Real–time intensity autocorrelation interferometer," *Appl. Opt.* vol. 17, No. 22, pp. 3534–3535, Nov. 1978.

Z.A. Yasa and N.M. Amer, "A Rapid–Scanning Autocorrelation Scheme for Continuous Monitoring of Picosecond Laser Pulses," *Opt. Commun.* vol. 36, No. 5, pp. 406–408, Mar. 1981.

*Primary Examiner*—James Phan

[57] ABSTRACT

A rapid and linear scanning optical delay line was attained by the use of a helicoid reflecting mirror which was spun by a DC servo motor for bringing about a periodic change in the optical path length of the reflected light beam. The double-pass scanning range of the delay time as large as 80 picosecond was attained by the scanning optical delay line having a helicoid reflecting mirror having 12 mm in pitch distance. The scanning optical delay line was used in an optical second-harmonic generation autocorrelator, which was thus capable of scanning successfully a picosecond optical pulse train. A real-time scanning of the picosecond laser pulse of a mode-locked Titanium:Sapphire was verified.

1 Claim, 3 Drawing Sheets

SCANNING OPTICAL DELAY DEVICE HAVING A HELICOID REFLECTING MIRROR

This application is a divisional application of U.S. application Ser. No. 08/760,036, filed on Dec. 4, 1996, now U.S. Pat. No. 5,784,186.

FIELD OF THE INVENTION

The present invention relates generally to a scanning optical delay device, and more particularly to a scanning optical delay device having a helicoid reflecting mirror capable of a rapid and linear scanning optical delay.

BACKGROUND OF THE INVENTION

The fast and large-scale scanning optical delay device was employed in the noncollinear autocorrelator by Wang and Pan in 1995. [Chi-Luen Wang and Ci-Ling Pan, Opt. Lett, 20, 1292 (1995)]. Similarly, it was employed in the pump probe experiment by Ganikhanov, et. el. in 1995. [Feruz Ganikhanov, Gong-Ru Lin, Wen-Chungg, C-S Chang, and Ci-Ling Pan, 67, 3465 (1995)]. The current application of the scanning optical delay device involves the incorporation of a shaker [R.F. Fork and F. A. Beissoer, Appl. Opt. 3534 (1978)] or a pair of rotatable parallel mirrors [Z. A. Yasa and N. M. Amer, Opt. Commun. 36, 406 (1981)] into an autocorrelator for displaying the autocorrelation signals of laser pulses by an oscilloscope. In addition, the optical delay of scanning speed as high as several hundred Hertz can be attained by a combination of optical grating, lens and vibrating mirror. For more details, please refer to Z. A. Yasa and N. M. Amer, Opt. Commun. 36, 406 (1981). Such devices as described above are limited in design in that they are capable of attaining the scanning range of the delay time for only a few picosecond, and that they can not be applied to a pump probe experiment in which the scanning of the wider laser pulse or the longer responsive time is called for. Moreover, the photoelectric measurement of the S parameter of transistor requires a longer optical delay time so as to attain with precision a low frequency response of the element, as shown by K. F. Kwong, D. Yankelevich, K. C. Chu, J. P. Heritage, and A. Dienes, Opt. Lett. 18, 558 (1993). The combination of a cam and a slide rail is capable of generating a scanning optical delay of 300 picosecond, as shown by D. C. Edelstein, R. B. Romney, and M. Scheuermann, Rev. Sci. Instrum. 62, 579 (1991). By using the combination of rotatable prisms, a fast scanning autocorrelator capable of a scanning range of the delay time as high as one nanosecond is attainable, as shown by G. Xinan, M. Lambsdorff, J. Kuhl, and E. Biachang, Rev. Sci. Instrum. 59, 2088 (1988).

SUMMARY OF THE INVENTION

The present invention discloses a scanning optical delay device comprising:

a helicoid reflecting mirror having a rotating shaft and a spiral strap wound on said rotating shaft along the direction of an axis of said rotating shaft, said spiral strap having thereon a smooth surface capable of reflecting partially or entirely an incident light beam, wherein any point of said smooth surface has a position capable of being expressed by a column coordinate equation as follows:

$$2\pi z - d\phi = 0$$

in which z is a coordinate along the direction of said axis of said rotating shaft; d, a pitch of said spiral strap; and $\phi$, an angular coordinate encircling said axis of said rotating shaft; and a rotating mechanism for driving said helicoid reflecting mirror to rotate around said axis of said rotating shaft;

wherein said any point of said smooth surface is capable of bringing about a reflected light beam having a variable optical path length at the time when an incident light beam strikes said any point of said smooth surface provided that said incident light beam is parallel to said axis of said rotating shaft, said variable optical path length of said reflected light beam being subject to a continuous change at such time when said helicoid reflecting mirror is driven by said rotating mechanism to rotate around said axis of said rotating shaft.

Preferably, said smooth surface of said spiral strap has a smoothness enabling said smooth surface to reflect almost entirely said incident light beam.

Preferably, said smooth surface is capable of reflecting a light beam of a wave length ranging between ultraviolet ray and infrared ray.

DETAILED DESCRIPTION OF THE EMBODIMENTS

Figure 1:
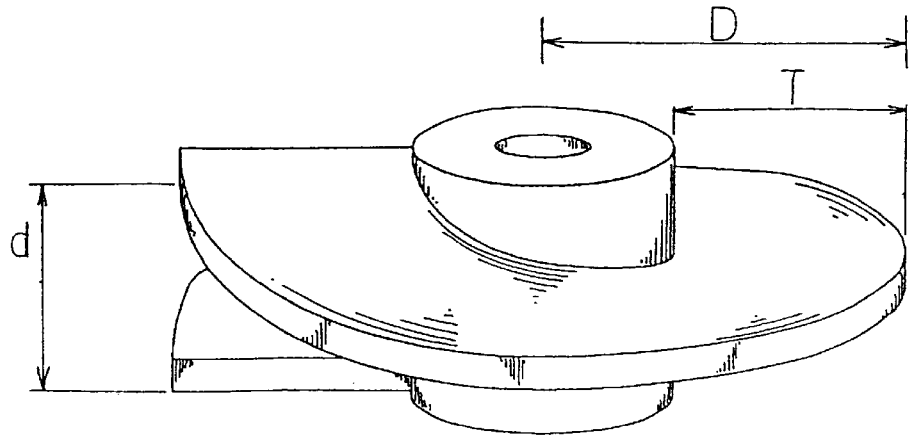
FIG. 1 shows a perspective view of a helicoid reflecting mirror of a first preferred embodiment of the present invention.

As illustrated in FIG. 1, the helicoid reflecting mirror of the first preferred embodiment of the present invention is capable of attaining a scanning range of optical delay line as large as 80 picosecond and is incorporated into a second-harmonic generation nonlinear autocorrelator, which is thus capable of a successful scanning of the laser pulse autocorrelation signal at the picosecond level.

The mathematical equation of the helicoid reflecting mirror of the first preferred embodiment of the present invention can be expressed by a column coordinate as follows:

$$2\pi z - d\phi = 0 \qquad \text{(B 1)}$$

In the above equation, z and φ stand respectively for the values of the coordinate axes along the rotating axis and the rotating direction, whereas d stands for the pitch. The normal line perpendicular to the mirror surface can be expressed by a mathematical equation as follows:

$$\bar{n} = \frac{2\pi\rho}{\sqrt{4\pi^2\rho^2 + d^2}}\hat{z} - \frac{d}{\sqrt{4\pi^2\rho^2 + d^2}}\hat{\phi} \qquad (2)$$

As long as the direction of incidence beam is parallel to the rotating axis (z-axis), the radius ρ of the reflecting point of the incidence beam on the mirror in motion remains constant. On the basis of the equation (2), it is apparent that the direction of the normal line of the reflection point also remains unchanged. In other words, the direction of reflection beam will remains constant with a minute change of optical path length. If the reflection beam and a split beam are focused by a lens, the light beams can be converged at a common point on the focal plane.

Figure 2:
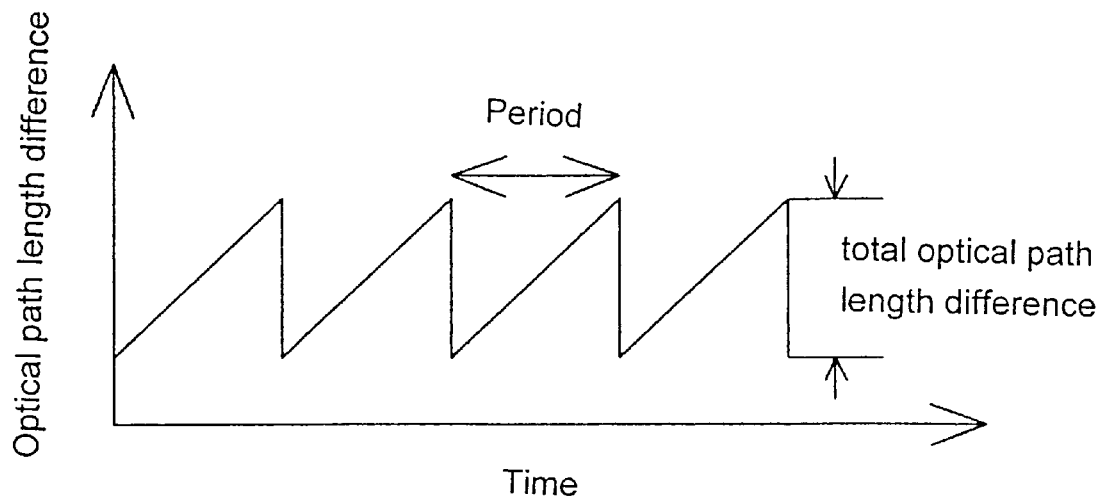
FIG. 2 is a time vs. optical path length difference plot, which shows a variation of optical path length difference of a scanning optical delay device having the helicoid reflecting mirror of the first preferred embodiment of the present invention.

The method for making the helicoid reflecting mirror of the first preferred embodiment of the present invention involves a first step of making a cylindrical body of aluminum, and then machining the cylindrical body of aluminum the same way as forming square threads. The cylindrical body is then ground and polished with the sand papers of various roughness until the surface of the cylindrical body is smooth and glossy in conformity with the requirements of the reflecting mirror. The reflecting mirror has a diameter (D) of 50 mm, a pitch (d) of 12 mm, and a depth (T) of 15 mm as shown in FIG. 1. The rotating shaft of the reflecting mirror is fastened with a DC servo motor (not shown in the drawings) so as to enable the reflecting mirror to rotate continuously. As a light ray strikes the reflecting surface of the reflecting mirror such that the light ray is parallel to the rotating axis, the light ray is reflected. The optical path length of the reflected light is changed continuously and linearly in view of the fact that the reflecting surface of the helicoid reflecting mirror is turned continuously. The variation of the optical path length is shown in FIG. 2. The period is dependent on the revolving speed of the motor, whereas the total optical path length difference is dependent on the pitch. The scanning range of the delay time of the first preferred embodiment of the present invention is 80 picosecond for the helicoid reflecting mirror having a pitch of 12 mm. Accordingly, it is necessary to increase the pitch up to 150 mm so as to attain the total optical path length difference at a nanosecond level. Without increasing the pitch, a plurality of the helicoid reflecting mirrors of the first preferred embodiment of the present invention must be used such that the light ray is reflected back and forth for several times.

Figure 3:
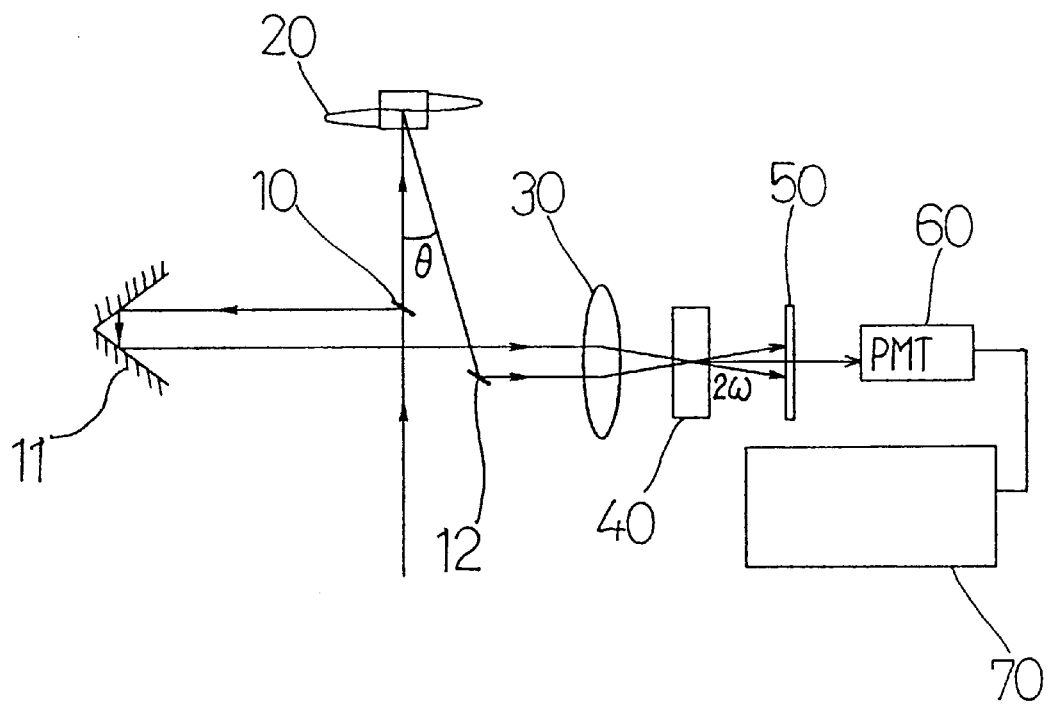
FIG. 3 shows a schematic view of an optical second-harmonic generation autocorrelator of the present invention.

In order to prove the validity of the optical delay line of the first preferred embodiment of the present invention, the helicoid reflecting mirror was used in the second-harmonic generation autocorrelator, as shown in FIG. 3. After a light ray had entered the autocorrelator, the light ray was split by a beam splitter 10 into two light beams, one of which was reflected by the helicoid reflecting mirror 20 of the first preferred embodiment of the present invention and the other beam, i.e., the "split beam", is reflected by a first reflector 11 that reflects the split beam along a predetermined path toward a lens 30. The position of the mirror 20 was adjusted with precision so as to keep the reflected beam on the optical plane of the entire system. The reflecting spot was adjacent to the fringe of the mirror 20 for minimizing the deformation of the reflected light. In view of the fact that normal line of the mirror 20 had a component of φ direction, an angle θ was formed between the reflected beam and the incident beam. The angle θ was expressed by the following equation (3):

$$\theta = 2 \cdot \tan^{-1}\left(\frac{d}{2\pi\rho}\right) \qquad (3)$$

A second reflector 12 redirects the reflected light beam from the helicoid reflecting mirror along a path substantially parallel to the path of the split beam reflected from the first reflector 11. The reflected beam and the split beam were converged by a lens 30. The focal point was provided with a nonlinear second-harmonic generation crystal 40 for generating the second-harmonic optical signal to be measured. The optical signal was filtered by a filter 50 before the optical signal was received by a photomultiplier tube (PMT) 60. The second-harmonic optical signal was then converted into an electrical signal by PMT 60. The electrical signal was received by an oscilloscope 70 through which the scanned autocorrelation signal was displayed.

Figure 4:
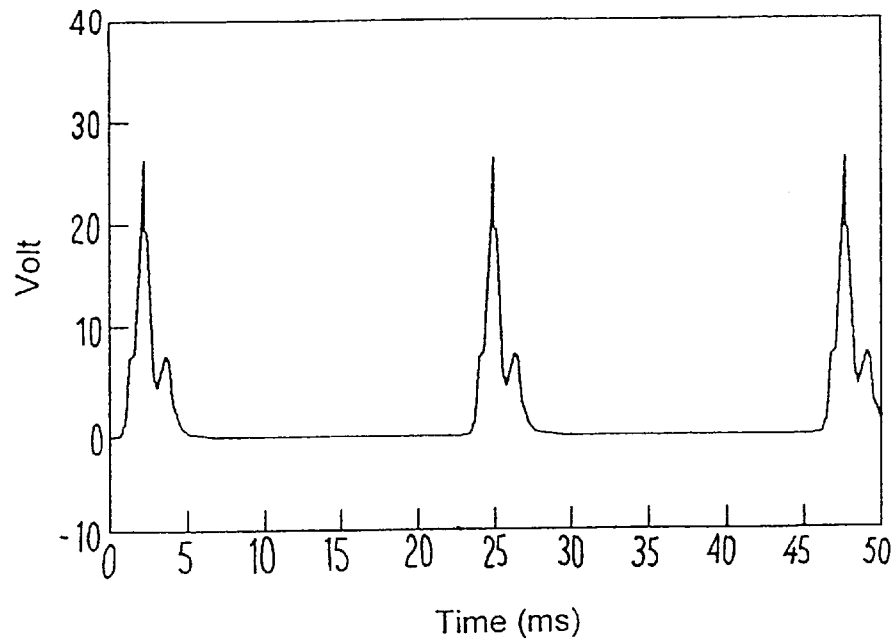
FIG. 4 shows a periodic scanning laser pulse autocorrelation signal displayed by an oscilloscope of the optical second-harmonic generation autocorrelator as shown in FIG. 3.
Figure 5:
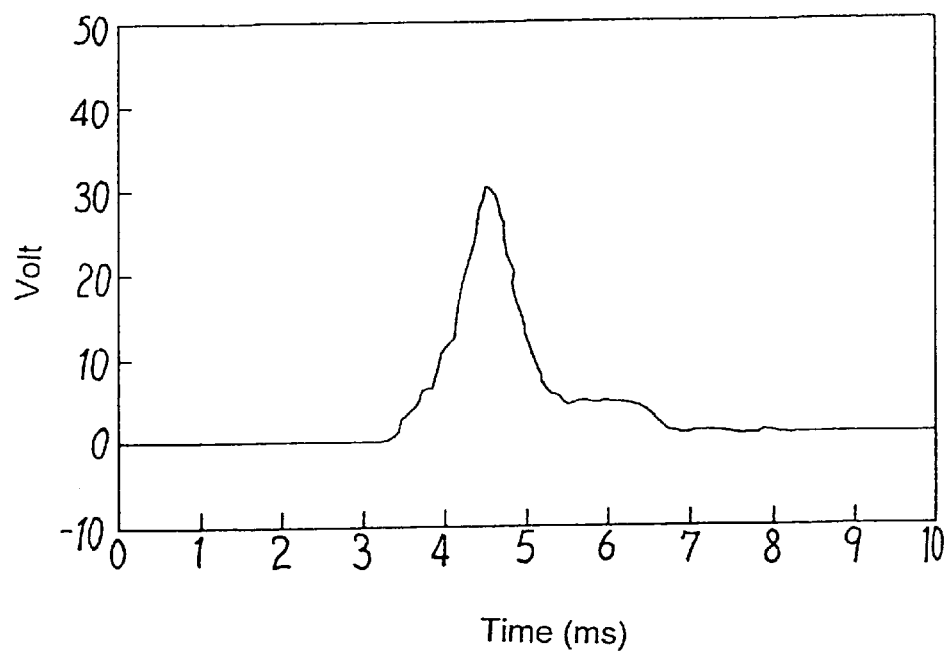
FIG. 5 is similar to FIG. 4 except that the time axis of FIG. 5 is expanded.

An optical pulse of 1.7 picosecond was introduced into the second-harmonic generation autocorrelator as a source of light tube measured. As the helicoid reflecting mirror 20 of the first preferred embodiment of the present invention was rotated, a periodic scanned signal was displayed by the oscilloscope 70, as shown in FIG. 4. The periodic scanned signal was also represented in FIG. 5 in which the time axis was expanded. According to FIGS. 4 and 5, it was readily apparent that the scanning frequency of the second-harmonic generation autocorrelator was as high as 43.5 Hz, and that the pulse width was scanned with precision. The autocorrelation signal was slightly from being symmetrical in view of the fact that the stability of the rotating shaft of the motor used in the first preferred embodiment of the present invention was poor. The poor stability of the rotating shaft of the motor was responsible for the swaying of the helicoid reflecting mirror in motion. Such a problem as described above can be easily resolved by using a stable motor.

The resolution of the linearly-scanned optical delay time can be expressed by a mathematical equation (4) as follows:

$$T_r = \frac{w}{2\pi\rho} \cdot \frac{2d}{c} \qquad (4)$$

In the above equation (4), w stands for the width of the light beam, whereas c stands for the light speed in the vacuum. According to the first preferred embodiment of the present invention, the resolution was about 0.5 picosecond. The resolution was limited mainly by the width (about 1 mm) of the light beam and the ratio (d/ρ) of the pitch of the helicoid reflecting mirror and the radius of the reflecting point. It is suggested that a resolution of 10 femtosecond is attainable if the pitch is reduced to an extent that the pitch is about one twentieth of the size of the pitch of the first preferred embodiment of the present invention. However, a reduction in the pitch of the helicoid reflecting mirror can result in a reduction in the total delay time (2 d/c). It must be added here that the resolution of 10 femtosecond is also attainable if the radius of the helicoid reflecting mirror is made as large as possible.

Figure 6:
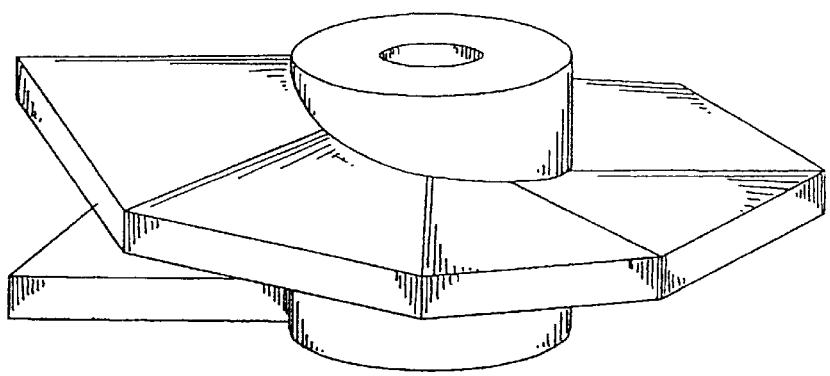
FIG. 6 shows a perspective view of a helicoid reflecting mirror of a second preferred embodiment of the present invention.
Figure 7:
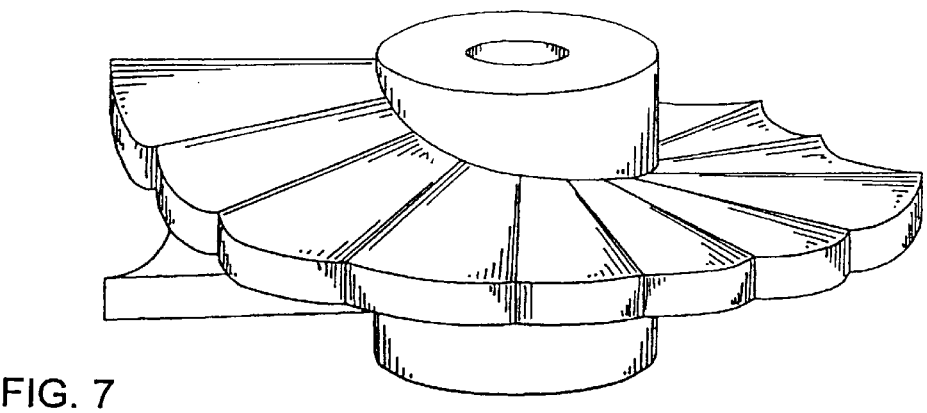
FIG. 7 shows a perspective view of a helicoid reflecting mirror of a third preferred embodiment of the present invention.

The embodiment of the present invention described above is to be regarded in all respects as being merely illustrative and not restrictive. Accordingly, the present invention may be embodied in other specific forms without deviating from the spirit thereof. For example, the helicoid reflecting mirror of the first preferred embodiment described above may be provided with a plurality of the interconnected reflecting planar mirrors in place of the spiral curved surface, as illustrated in FIG. 6. The surface of each of the reflecting planar mirrors has a normal line perpendicular to the direction of the rotating shaft radius. In addition, the angles formed by the normal lines and the axis of the rotating shaft are different from one another. Moreover, the helicoid reflecting mirror of the first preferred embodiment of the present invention may be provided with a plurality of the interconnected concave mirrors (as shown in FIG. 7) or convex mirrors (not shown in the drawing) in place of the spiral curved surface of the first preferred embodiment. Each of the concave or convex mirrors has an optical symmetrical axis perpendicular to the direction of the rotating shaft radius. In addition, the angles formed by the optical symmetrical axes and the axis of the rotating shaft are different from one another. Moreover, the helicoid reflecting mirror of the present invention may be provided with a combination of the spiral curved surface, the interconnected planar reflecting mirrors, the interconnected concave mirrors and the interconnected convex mirrors.

The validity of the present invention was positively confirmed by the experimental results as described above. The present invention can be used in the autocorrelator capable of scanning successfully the autocorrelation curve of the picosecond optical pulse. The scanning optical delay device of the present invention has therefore a great deal of potential in the research and the commercial applications.

What is claimed is:

1. A scanning optical delay device comprising:

a helicoid reflecting mirror having a rotating shaft and a reflecting pseudo-helicoid strap wound on said rotating shaft along the direction of an axis of said rotating shaft, said reflecting pseudo-helicoid strap having a plurality of concave or convex reflecting mirrors interconnected such that an optical symmetrical axis of each of said concave or convex reflecting mirrors is perpendicular to the direction of a radius of said rotating shaft, and that angles formed between said optical symmetrical axes and said axis are different from one another.

* * * * *